UNITED STATES PATENT OFFICE.

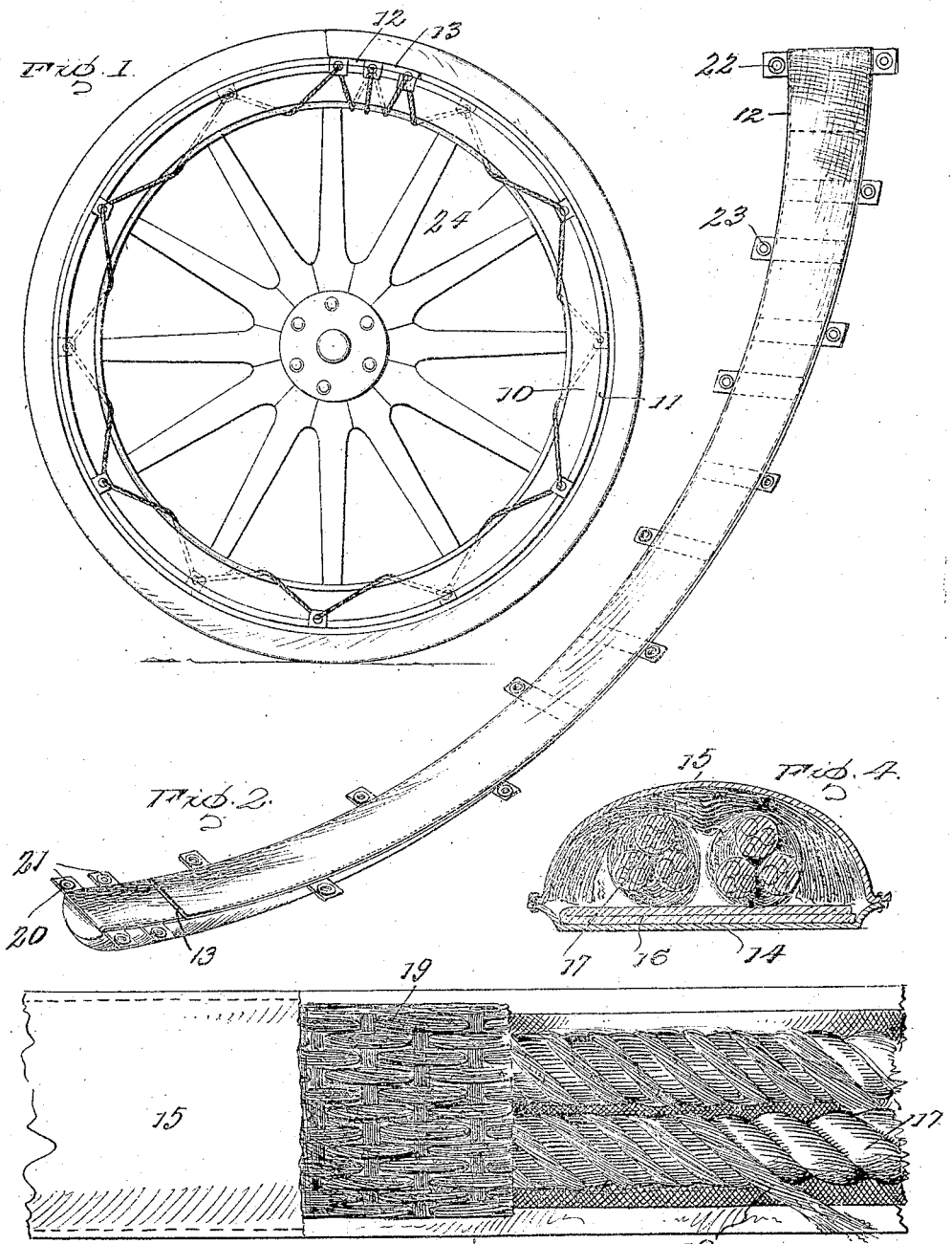

WILLIAM F. AICHELE, OF GOOD GROUND, NEW YORK.

EMERGENCY-TIRE.

1,377,170.

Specification of Letters Patent.   Patented May 10, 1921.

Application filed April 14, 1919. Serial No. 289,780.

*To all whom it may concern:*

Be it known that I, WILLIAM F. AICHELE, a citizen of the United States, residing at Good Ground, in the county of Suffolk and State of New York, have invented certain new and useful Improvements in Emergency-Tires, of which the following is a specification.

This invention has relation to tires for vehicle wheels, and has for an object to provide an emergency tire adapted to be applied to a vehicle wheel after the usual pneumatic or other form of tire is removed therefrom to provide a tread surface of sufficient durability to stand the wear and to enable the vehicle to travel to some point where the damaged tire can be repaired and replaced.

Another object of the invention is to provide an emergency tire of the character above set forth which is composed of strands of hemp rope or the like with a combination of heavy fabric inclosed within a container or envelop of lighter fabric with means for securely strapping or tying the device to a vehicle wheel.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear.

Figure 1 is a view in side elevation of a vehicle wheel illustrating an emergency tire applied thereto.

Fig. 2 is a view in perspective of an emergency tire constructed in accordance with my invention.

Fig. 3 is a view of a portion of the tire in plan illustrating several layers detached to show the interior construction thereof, and Fig. 4 is a view in transverse section of the tire.

With reference to the drawings, 10 indicates the felly of a vehicle wheel and 11 the clencher or other rim. My tire, shown in Fig. 1 is applied thereto by wrapping the same around the rim bringing the ends of the tire together.

By referring to Figs. 2, 3 and 4 it will be seen that the construction of the tire consists first of a strip of canvas or other heavy fabric shown at 14 designed to be applied to the surface of the rim. The tread strip 15 of canvas is then secured at its edges to the edges of the strip 14 to form an envelop in which to contain the filling. The filling comprises one or more layers of very heavy hemp fabric 16 or the like such as burlap applied to the outer surface of the strip 14, and extending from end to end of the tire and two or more sections of tightly twisted cable shown at 17. Owing to the fact that the strands forming the cable are tightly twisted, it will be noted that spiral grooves are defined between the strands and to fill up these grooves to form a practically uniform cylindrical surface I wrap a loose hemp twine 18 spirally around both cables as shown in Fig. 3. I then apply to the cables a strip of fabric 19 formed of interwoven heavy strands of loose hemp fibers or twine to fill out the interstices between the cable and within the envelop and to form a cushion as well as round out the outer surface of the tire as shown in Fig. 4. A pair of transversely extending strips of canvas or the like 20 are secured to the outer surface of the strip 14 and to extend beyond the margins thereof, and brass eyelets or eyelets formed of other material indicated at 21 are inserted in the ends of the strips. Strips 22 are also provided at the opposite end of the tire, other strips 23 being provided along the length of the tire the ends however projecting at opposite sides in staggered relation as shown in Fig. 2. Eyelets are also provided in said strips 22 and 23. It will be noted that at one end the outer strip of fabric 15 terminates short of the inner strip of fabric 14 so that the latter is continued in the form of a flat extension 12 and that at the other end the inner strip of fabric 14 terminates short of the outer strip of fabric 15 to form a reduced portion 13 arranged to receive the flat extension 12. With this arrangement, when the emergency tire is applied to the wheel the ends thereof overlap, as shown in Fig. 1, to form a continuous, even stretched tread surface.

In use a rope or cable 24 is knotted at one end and said end inserted in either the strip 20 or 22 and then passed from one side of the tire to the other inside the felly through the eyelets in the strips 23 as shown in Fig. 1. Thus, the tire will be securely held to the rim of the wheel. It will be noted that the heavy fabric 19 forms a cushion to absorb the road shocks to some extent, while the heavy cables 17 support the load of the vehicle in an efficient manner.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:

1. An emergency tire comprising an inner strip of fabric to encircle a wheel, an outer strip secured to said inner strip along the edges thereof and wider than said inner strip and forming therewith a casing, said outer strip terminating short at one end of the inner strip and said inner strip terminating at the other end of the casing short of the outer strip so as to permit overlapping, a plurality of layers of relatively light fabric within the casing, a plurality of strands of heavy cable within the casing, and a layer of relatively coarse fabric applied over the cables and within the interstices thereof to fill out the casing to a substantially semi-circular configuration in cross section.

2. An emergency tire comprising a fabric casing having a rim engaging strip, a filling for said casing including at least one fibrous rope extending circumferentially of said casing, a fabric of interwoven fibrous material extending circumferentially and transversely of said casing between it and said rope and a fabric layer extending circumferentially of said casing between it and said rope.

3. An emergency tire comprising a fabric tread strip and a fabric rim engaging strip, said strips being secured together along their contiguous edges to form an envelop, a plurality of layers of fabric extending circumferentially of said envelop in interior surface engagement with said rim engaging strip, a plurality of fibrous ropes extending circumferentially of said envelop in surface engagement with the innermost one of said layers and a layer of fabric consisting of interwoven fibrous material extending circumferentially and transversely of said envelop in surface engagement therewith and enclosing said ropes.

4. An emergency tire comprising a casing having a rim engaging portion and a tread portion, a plurality of twisted cables within said casing, a filling of twine located in the spiral grooves between the strands of said cables to even out the surfaces thereof, a cushioning strip composed of interwoven fibrous strands located between said cables and the tread portion, a fabric reinforcement strip located between said cables and the rim engaging portion and means for securing said tire upon said rim.

In testimony whereof I affix my signature.

WILLIAM F. AICHELE. [L. S.]